2,785,113

DEHYDRATION OF HYDRAZINE BY DISTILLATION WITH A SUBSTITUTED HYDROXYBENZENE

Richard N. Lewis, North Haven, Conn., assignor to Olin Industries, Inc., New Haven, Conn., a corporation of Delaware No Drawing. Application February 23, 1954, Serial No. 412,053

6 Claims. (Cl. 202—42)

This invention relates generally to hydrazine and more particularly to a novel and improved method for dehydrating solutions of hydrazine.

Hydrazine, as usually prepared in commerce today, is obtained in a dilute aqueous solution. Such commercial procedures generally involve use of the Raschig synthesis; namely, a reaction of sodium hypochlorite on aqueous ammonia, thus:

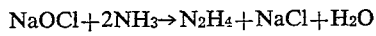

$$NaOCl + 2NH_3 \rightarrow N_2H_4 + NaCl + H_2O$$

Since hydrazine and water form a constant boiling mixture at a concentration of about 64 to 70%, it is the maximum obtainable concentration from ordinary fractional distillation processes.

Since hydrazine in anhydrous form is very desirable for many commercial purposes, other methods than distillation—methods which in general are more time-consuming, more expensive, less efficient, sometimes dangerous—had to be resorted to. For example, hydrazine was precipitated in the form of its sulfate $N_2H_4.H_2SO_4$, and regenerated in anhydrous form by treatment with liquid ammonia. Raschig (Ber. 43, 1927(1910)) used another method involving refluxing hydrazine with solid sodium hydroxide. Simple distillation of this mixture resulted in a concentrated hydrazine. However, neither of these methods is suitable for continuous operation and both are subject to losses of hydrazine.

It has been proposed to prepare a more concentrated solution of hydrazine by distillation with benzene, toluene or xylene. Such concentration processes, however, do not result in a concentration beyond the hydrazine hydrate composition. A disclosure of this technique is seen in Hurd and Bennett (J. Am. Chem. Soc. 51, 265 (1929)) who state that their process only effects a limited concentration.

It is, therefore, an object of this invention to provide an improved method for separating hydrazine from water. Another object of this invention is to provide a process for producing substantially anhydrous hydrazine. Still another object of this invention is to provide a novel distillation method for removing water from aqueous solutions of hydrazine. Other objects will become apparent to those skilled in the art upon reading the detailed disclosure which follows hereinafter.

In accordance with this invention, the foregoing objects are accomplished by distilling aqueous hydrazine with organic acids having an ionization constant not greater than $1.3 \times 10^{-10}$. More specifically, the aqueous hydrazine is distilled with a substituted hydroxybenzene and upon distillation there is effected a removal of the water from the hydrazine. The distillation that generally occurs is of the azeotropic type; namely, the distilling of a constant boiling mixture of the substituted hydroxybenzene and water. But this feature is deemed only incidental, the retention of hydrazine by the strong hydrogen bonds that are formed with the substituted hydroxybenzene being considered of more importance.

The residue from this distillation is a practically anhydrous solution of hydrazine and of substituted hydroxybenzene from which the hydrazine may be recovered by various techniques. Among these techniques distillation of the hydrazine from the substituted hydroxybenzene appears to be the most attractive. The hydrazine that results from this distillation will either be in the anhydrous state or else of such concentration that advantages can be taken of the known fact that anhydrous hydrazine will distill over as a first fraction, when highly concentrated solutions of hydrazine, namely, solutions richer in hydrazine than the hydrazine-water azeotrope compositions are distilled. One may also employ a precipitation technique in which the hydrazine is precipitated from the substituted hydroxybenzene solution as a salt by the use of sulfuric, hydrochloric, etc., acids and then regenerated with a base. This latter technique, in combination with the preliminary step of hydrazine concentration by distillation with the substituted hydroxybenzene is advantageous over the old technique of precipitation in that a better precipitation results. This follows from the fact that more concentrated solutions give better precipitations.

For a batch distillation, the organic acid having an ionization constant not greater than $1.3 \times 10^{-10}$ is added to the aqueous hydrazine which may be in the form of Raschig liquor. A physical extraction or decantation of the two layers may first be performed as outlined and described in copending application, Serial Number 412,051, filing date February 23, 1954. The substituted hydroxybenzene layer is separated from the water layer and then it is distilled. As a first fraction, there will generally be obtained a water-organic acid mixture. The fractions that follow will be of increasing hydrazine concentration until a maximum is reached. If this concentrated hydrazine fraction (greater than the hydrazine-water azeotrope composition) is not sufficiently anhydrous for the purpose desired, it is redistilled in a separate column. Anhydrous hydrazine will then distill over as a first fraction.

Where no preliminary physical extraction of the water from the hydrazine is used after the addition of the organic acid compound to the aqueous hydrazine, the entire mixture is distilled. The first distillate fraction will then generally consist of a large amount of water and organic acid compound. Subsequent fractions will consist of increasing concentrations of hydrazine. The most concentrated fraction will be found to consist of anhydrous hydrazine or else a hydrazine of such concentration, that upon a further separate distillation will yield an anhydrous hydrazine as the first fraction.

For a continuous distillation, several techniques may be employed. Obviously other modifications of these techniques may also be used.

A preferred technique for a continuous operation involves a preliminary physical separation or decantation step as outlined in copending application, Serial Number 412,051, filing date February 23, 1954. This involves the continuous adding of an organic acid having an ionization constant not greater than $1.3 \times 10^{-10}$ and an aqueous hydrazine solution, such as a Raschig liquor, to an appropriate separating apparatus. The organic acid layer that forms is then continuously removed and fed to the middle of a fractionating column. As the distillation proceeds a water-organic acid mixture is found to distill off at the top while a hydrazine-organic acid mixture is found at the bottom of the column. This latter mixture is continuously removed and charged to the middle of another distillation column. Concentrated hydrazine distills off at the top while the residue consists of organic acid compound and some traces of water and hydrazine. This residue may be recycled to the originally used separating apparatus.

Where no prior physical separatory technique is used, the organic acid compound such as a substitute hydroxybenzene may be continuously added to aqueous hydrazine and the entire mixture charged to a fractionating column near its base. More water-substituted hydroxybenzene may be continuously added to the column near its top. As the distillation proceeds a water-phenol mixture is found to distill off at the top while a hydrazine-substituted hydroxybenzene mixture is found at the bottom of the column. This latter mixture is continuously removed and charged to the middle of another distillation column. Concentrated hydrazine distills off at the top while the residue consists of the substituted hydroxybenzene and some traces of water and hydrazine. This residue may be mixed with new aqueous hydrazine and recycled to the fractionating column.

One may also directly charge in a continuous manner the aqueous hydrazine, such as that obtained as a Raschig liquor, to a fractionating column near its base while charging organic acid compound near the top. As the distillation proceeds a hydrazine-organic acid mixture is found at the bottom as a residue. It is continuously removed and charged to the middle of another distillation column. Concentrated hydrazine distills off at the top while the residue consists of organic acid compound and some traces of water and hydrazine. This residue may be recycled to the fractionating column and introduced with the charge being introduced near the top of the column.

In either case, batch or continuous, it has been found that the water which is removed by the technique of this invention, is in most cases free of all but traces of hydrazine. It can, therefore, be discarded after its separation from its contained organic compound without loss in overall efficiency.

The invention is illustrated more fully by the examples which follow:

Example I

Hydroxybenzene (49.1 grams) was added to 25.5 grams of an aqueous solution containing 14.3 grams of hydrazine. The mixture was fractionally distilled using the technique described for batch distillation above, with the following results:

| Fraction | Weight, grams | Percent Hydrazine |
| --- | --- | --- |
| 99.3–99.9° C | 6.6 | 0.27 |
| 99.9–119.0° C | 9.5 | 40.7 |
| 119.0–122.0° C | 4.8 | 83.0 |
| Residue | 53 | 8.1 |

Example II

Meta-methyl hydroxybenzene (167.3 grams) was added to 60.7 grams of an aqueous solution containing 34.0 grams of hydrazine. The mixture was fractionally distilled by the method as disclosed in Example I with the following results:

| Fraction | Weight, grams | Percent Hydrazine |
| --- | --- | --- |
| 98.7–100.2° C | 18.3 | 0.1535 |
| 100.2–117.6° C | 10.0 | 37.3 |
| 113.5–119.0° C | 29.1 | 92.6 |
| Residue | | 2.03 |

A mixture of substituted hydroxybenzenes, cresylic acid (101.0 grams), having a boiling range 202–216.5° C., was added to 37.3 grams of an aqueous solution containing 23.9 grams of hydrazine. The mixture was fractionally distilled according to the method outlined in the prior examples and an analysis of the fractions obtained gave the following results:

| Fraction | Volume, cc. | Percent Hydrazine |
| --- | --- | --- |
| 96.8–100.0° C | 8 | 0.127 |
| 100.0–121.0° C | 24.8 | [1] 77.2 |
| 121.0–202.0° C | 22 | |
| Residue | 80.9 | 0.0 |

[1] A sample taken near the end of this fraction contained 91.0% hydrazine.

As can be seen from the above examples, use of the method of purification disclosed herein results in either an anhydrous hydrazine or else in a hydrazine concentration which will, upon a further separate or continued distillation, yield an anhydrous hydrazine as the first fraction; advantage being taken of the fact that anhydrous hydrazine will distill over as the first fraction when aqueous hydrazine, having a concentration greater than the hydrazine-water azeotrope composition, is distilled. The objects of this invention are therefore readily accomplished by the use of the procedure hereinbefore disclosed.

The theory believed to be the foundation of the process herein disclosed may be stated as follows:

Organic acid compounds, being measurably acidic, form very strong hydrogen bonds with hydrazine. The water is, therefore, displaced from the hydrazine because of the latter's attraction to the added organic acid compound. The water is, therefore, easily separated from the hydrazine without fear of having a constant boiling mixture (azeotrope) consisting of hydrazine and water. Distillation is employed to effect such separation and although a water-organic acid azeotrope is generally found to result, it is considered merely incidental. A more important aspect appears to reside in the fact that strong hydrogen bond formation results from the addition of the organic acid compound to the aqueous hydrazine. The failure of the hydrocarbons in the distillation employed by Hurd and Bennett to produce anhydrous hydrazine as discussed above was probably due to the fact that the hydrocarbons employed did not form strong hydrogen bonds with the hydrazine contained in the aqueous hydrazine, and therefore had very little effect on the mixture.

Organic acid compounds which have been found operable in the practice of this invention include hydroxy benzenes which are unreactive towards hydrazine and which are measurably acidic and, therefore, will form strong hydrogen bonds with hydrazine. Examples which may be included in this class are the substituted hydroxy benzenes such as meta-methyl hydroxybenzene, para-methyl hydroxybenzene, ortho-methyl hydroxybenzenes, ortho-xylenol, para-xylenol, meta-xylenol, carvacrol, thymol, pseudocumenol, mesitol and mixtures, such as cresylic acid. Hydroxy benzenes containing functional groups non-reactive toward hydrazine such as halogen groups, ether groups, thioether groups, unsaturated groups as well as other non-reactive groups may also be used.

In the work leading to the confirmation of the theory described above it was found that distillation with hydroxybenzene is substantially as effective as distillation with cresol as far as removing water is concerned, but it suffers from the drawback that hydrazine cannot be completely removed from hydroxybenzene because a maximum boiling azeotrope with the hydrazine is formed. The use of hydroxybenzene, therefore, necessitates a recycling of the phenol-hydrazine azeotrope in order to obtain a good recovery of hydrazine. Other hydroxy benzene compounds such as para-methyl hydroxybenzene were, however, found not to form azeotropes to any sufficient extent and, therefore, are believed to be of more utility than phenol in formulating an economical commercial dehydration process.

While a detailed description of this invention has been provided, it is realized that those skilled in the art may make modifications in and adaptations of the process described without departing from the spirit and scope of this invention.

The invention having thus been described, what is claimed and desired to be secured by Letters Patent is as follows:

1. The process of dehydrating aqueous hydrazine which comprises distilling the mixture with meta-methyl hydroxybenzene.

2. The process of dehydrating aqueous hydrazine which comprises distilling the mixture with ortho-methyl hydroxybenzene.

3. The process of dehydrating aqueous hydrazine which comprises distilling the mixture with cresylic acid.

4. The process of dehydrating aqueous hydrazine which comprises distilling the mixture with dimethyl hydroxybenzene.

5. The process of dehydrating aqueous hydrazine which comprises distilling a mixture thereof with ortho-xylenol.

6. A process of dehydrating aqueous hydrazine which comprises distilling a mixture thereof with a compound having the formula $C_6H_{5-n}R_nOH$ wherein "R" is a radical selected from the group consisting of methyl, isopropyl, ether, and thioether, and "n" is from 1 to 3.

References Cited in the file of this patent
UNITED STATES PATENTS

| | | |
|---|---|---|
| 2,537,791 | Schwarcz | Jan. 9, 1951 |
| 2,678,298 | Nicolaisen | May 11, 1954 |